United States Patent [19]

Bednar et al.

[11] Patent Number: 5,539,028

[45] Date of Patent: Jul. 23, 1996

[54] WATER-RESISTANT FIBERBOARD AND METHOD

[75] Inventors: Allan F. Bednar, Pinellas; Kenneth W. Espeut, Hillsborough, all of Fla.

[73] Assignee: The Celotex Corporation, Tampa, Fla.

[21] Appl. No.: 480,971

[22] Filed: Jun. 7, 1995

Related U.S. Application Data

[63] Continuation-in-part of Ser. No. 216,656, Mar. 23, 1994, abandoned.

[51] Int. Cl.⁶ .......................................... C08L 3/00
[52] U.S. Cl. .................. 524/47; 162/142; 162/145; 162/146; 264/109; 156/62.2; 524/14; 524/55; 524/267
[58] Field of Search .................... 162/145, 146, 162/142; 264/109; 156/62.2; 524/14, 47, 55, 267

[56] References Cited

U.S. PATENT DOCUMENTS

| | | | |
|---|---|---|---|
| 2,686,461 | 8/1954 | Heritage et al. | 92/39 |
| 2,773,764 | 12/1956 | Park | 92/3 |
| 3,090,699 | 5/1963 | Bulson | 117/62.2 |
| 4,587,278 | 5/1986 | Dotzauer et al. | 523/200 |
| 4,861,822 | 8/1989 | Keskey et al. | 524/559 |
| 4,963,603 | 10/1990 | Felegi et al. | 524/13 |
| 5,047,463 | 9/1991 | Keskey et al. | 524/426 |
| 5,071,511 | 12/1991 | Pittman | 162/145 |
| 5,134,179 | 7/1992 | Felegi et al. | 524/13 |
| 5,145,625 | 9/1992 | Dotzauer et al. | 264/109 |
| 5,277,762 | 1/1994 | Felegi et al. | 162/145 |

*Primary Examiner*—Melvyn I. Marquis
*Attorney, Agent, or Firm*—Charles W. Vanecek

[57] ABSTRACT

A water-resistant, fiberboard for use in making panels and tiles for building construction is disclosed. The fiberboard contains primary components which include mineral fiber, low density, nonfibrous inorganic filler and organic fiber. The fiberboard includes about 0.1–2 wt % of silicone fluid, preferably polymethylhydrogensiloxane, which improves water resistance without adversely affecting other physical properties.

20 Claims, 1 Drawing Sheet

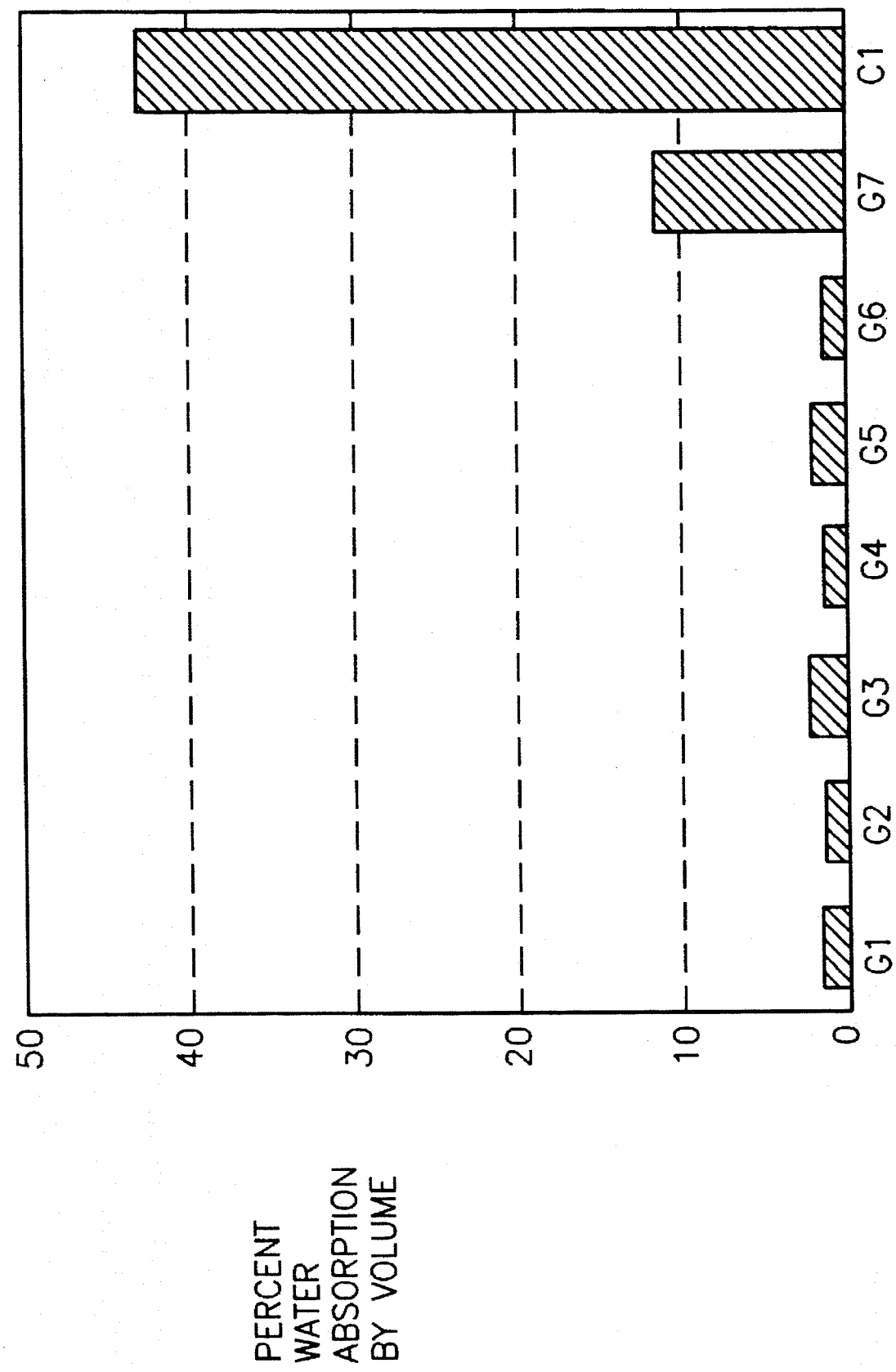

WATER-RESISTANT FIBERBOARD AND METHOD

FIELD OF THE INVENTION

This is a continuation-in-part of application Ser. No. 08/216,656, filed Mar. 23, 1994, abandoned.

The present invention relates to fiberboard used in building construction.

BACKGROUND OF THE INVENTION

Fiberboard is commonly used in the building construction industry for panels and tiles, such as ceiling tiles. Generally, fiberboard includes primary components held together with a binder. Primary components typically include mineral fiber, such as mineral wool, cellulosic fiber and a filler component. Starch is a binder favored by the industry.

Fiberboard is often installed in bathrooms, laundry rooms, and kitchens where it is exposed to high humidity. Fiberboard panels are occasionally soaked with water from pipe or roof leaks. Humid and/or wet conditions generally cause conventional fiberboard to deteriorate.

Exposure to moisture weakens the starch binder of mineral fiberboard. Fiberboard also absorbs moisture which increases its weight. Water-laden or weakened fiberboard can sag and/or break. This is a particular hazard when the fiberboard is used for ceiling tiles. Additionally, fiberboard panels can buckle from lateral expansion due to water absorption.

Various attempts to address moisture-related problems with fiberboard have been made. Attempted solutions include coating the fiberboard with a moisture barrier layer and laminating the mineral fiberboard with a stiffening layer to form a composite structure. These methods add to the difficulty and cost of manufacturing the product.

Another attempt to improve the moisture resistance of fiberboard is to replace the starch with a water-resistant binder. U.S. Pat. No. 4,861,822 discloses an alkali-swellable polymer, latex binder for cast ceiling tiles. U.S. Pat. No. 4,587,278 discloses moisture-resistant, mineral fiberboard compositions including 4–20 weight percent of an acrylate/acrylonitrile/styrene copolymer binder.

U.S. Pat. No. 5,134,179 teaches strengthening acoustical ceiling tile of mineral fiberboard by using a newsprint fiber component coated with a latex binder. These methods require special materials which add significantly to the product cost.

It is desired to provide a moisture resistant, starch-bound fiberboard which can be produced without significantly changing existing manufacturing methods and/or adding to costs.

SUMMARY OF THE INVENTION

The present invention is directed to an improved moisture-resistant fiberboard made with small amounts of silicone fluid. More specifically, the fiberboard is made of mineral fiber, low density, nonfibrous inorganic filler, and/or organic fiber (primary components) combined with starch, flocculant, and silicone fluid. The fiberboard generally comprises up to about 98 wt % primary components, about 1 to about 15 wt % starch, about 0.01 to about 0.5 wt % flocculant and about 0.01 to about 2 wt % silicone fluid, where the percentages add to a total of 100 wt % of the combined materials. The silicone fluid imparts to the starch-bound fiberboard a degree of waterproofness unmatched by conventional waxes. Silicone is found to be more efficient than wax in waterproofing in that much less silicone is required to confer the same level of waterproofness.

The component materials are mixed with water to form a slurry from which fiberboard sheets are produced on conventional equipment such as Fourdrinier or cylinder equipment. Such equipment removes the water so that the resultant fiberboard consists essentially of the starting ingredients.

BRIEF DESCRIPTION OF THE DRAWING

The FIGURE is a bar graph of volume percent water absorption for selected fiberboard samples.

DETAILED DESCRIPTION OF THE INVENTION

Fiberboard of the present invention is made from primary components, starch, a flocculant and a silicone fluid. Conventionally, the primary components are mineral fiber; low density, nonfibrous inorganic filler; and organic fiber. At least one of the two fiber components is present in the fiberboard. Best results are obtained for fiberboard including at least two of the three conventional primary components.

In making fiberboard, the ingredients are mixed with an effective amount of water to obtain a slurry. The ratio of water to nonaqueous ingredients is chosen to provide consistency and fluid flow characteristics suitable for subsequent processing of the slurry. Typically, the slurry is in the range of about 2 to about 10 wt % nonaqueous ingredients, preferably about 5 wt %.

The fiberboard is made by pumping the slurry from a headbox onto a Fourdrinier-type support to form a wet mat. Mat thickness is typically in the range of about ⅛ inch to about 1½ inch. Excess water is removed initially by gravity, compression and suction, and subsequently, by thermal drying. The mat is shaped into uniformly sized articles, typically sheets of standard sizes.

The mineral fiber component can be any of the conventional inorganic fibers used in fiberboard. Representative mineral fibers include mineral wool, such as slag wool and rock wool, glass fiber and any combination of them. Slag wool is preferred. Generally, mineral wool is gas blown blast furnace slag of aluminum and calcium silicates. The fiber can be untreated or can be sized with a conventional sizing agent.

The low density, nonfibrous inorganic filler component is a fine particulate material having high surface area and low density to provide volume without great weight. Perlite, an alkaline earth silicate ore of volcanic origin, is a preferred filler. Perlite is expanded by heat treatment at high temperature to obtain density typically in the range of about 2 to about 10 pounds/cubic foot. Vermiculite, feldspar, chalk and mica are also representative of such inorganic fillers.

The organic fiber component is preferably any conventional cellulosic fiber such as cellulose traditionally used in papermaking. The organic fiber component generally provides strength as the wet mat is formed from the slurry. Such fiber can be virgin cellulosic fiber, such as wood fiber, recycled fiber obtained from recovered paper products or a combination of both. A preferred organic fiber component material for fiberboard compositions is newsprint.

Preferably all three primary components are used such that mineral fiber is present from about 20 to about 75 wt %, more preferably about 28 to about 40 wt %; low density, nonfibrous inorganic filler is present from about 10 to about 50 wt %, more preferably about 25 to about 42 wt % and organic fiber is present from about 5 to about 40 wt %, more preferably about 15 to about 23 wt %. Typically, the primary components will account for at least 90 wt % of the fiberboard, and can comprise as much as 98 wt %. The primary components may comprise as little as 70 wt % where special purpose additives, such as clay, are used.

In alternate embodiments, the fiberboard contains two of the three primary components. For example, one such alternate fiberboard embodiment contains perlite and newsprint fiber, but no mineral fiber. Preferably, perlite is present from about 20 to about 98 wt % and newsprint fiber is present from about 10 to about 70 wt %.

In another preferred embodiment, mineral fiber and perlite are present and newsprint is absent. This fiberboard is especially suited to applications requiring superior fire resistance. In such fiberboard, mineral fiber is present from about 30 to about 98 wt % and perlite is present from about 10 to about 60 wt %.

In addition to the binding effect of the organic fiber, starch is used as a binding agent in the fiberboard. Starch is a complex carbohydrate refined from plants, usually from corn. It may be used in the present invention as dry granules or in a liquid-swollen state. The fiberboard contains about 1 to about 15 wt % starch, preferably about 7 to about 11 wt % starch.

A flocculant is provided for agglomerating slurry particles to facilitate formation of the mat during board production. Conventional high molecular weight polymers suitable for use with cellulosic fiber and perlite can be used as the flocculant. Representative flocculants include polyacrylamide, acrylate-substituted acrylamide copolymers, and polyethyleneimides. Gendriv® 162, a 2-hydroxy-3(trimethylamino) propyl ether chloride derivative of guar available from Henkel Corporation, Minneapolis, Minn. is a preferred flocculant.

It has been discovered that the addition of suitable silicone fluid to the fiberboard composition slurry imparts significant moisture resistance to the resulting product without wishing to be bound by a particular theory. It is believed that the silicone fluid molecules form a barrier coating on the surface of the starch-bound fiber and perlite matrix which inhibits water absorbance. Fiberboards having superior properties are prepared by using silicone fluid in place of conventional waxes. A significant improvement in water-proofness is realized by the replacement. Percent improvements of 90% or greater, as determined by ASTM D1037, are realizable.

Silicone fluid is a low molecular weight polyorganosiloxane. Generally, molecular weight of silicone fluid is in the range from about 300 to about 25,000 and it is a liquid at room temperature, i.e., about 20°–30° C. Polymethylhydrogensiloxane (PMHS) available from Wacker Silicones Corporation, Adrian, Mich. under the designation BS94, was found to be particularly effective in enhancing moisture-resistance. Mixtures of other silicone fluids with PMHS can also be used. Other silicone fluids perform to varying degree as moisture resistance agents for fiberboard.

The silicone fluid is present from about 0.01 to about 2 wt % and, preferably, from about 0.1 to about 1.0 wt %, and, more preferably, from about 0.2 to about 1.0 wt %. In using PMHS, the silicone fluid is preferred in about 0.1 wt % to about 0.5 wt % concentration.

Below about 0.01 wt %, the silicone fluid concentration is inadequate to provide resistance to water absorption. Water absorption significantly decreases with increasing silicone fluid concentration from 0.01 wt %. The water-resistant effect of adding the silicone fluid stabilizes at a concentration of about 0.1 wt %.

As noted above, it is likely that water-resistance caused by silicone fluid is a surface phenomenon. Thus the effectiveness of silicone fluid is influenced by the amount of surface area of fiber and filler components. Accordingly, preferred silicone fluid concentration can vary slightly within the operative range depending on the relative proportions of mineral fiber, perlite and organic fiber. A person with ordinary skill in the art can determine an effective concentration without undue experimentation. While silicone's waterproofing effectiveness will vary depending on the nature of the fiberboard ingredients, silicone has been found to outperform wax at a given fiberboard composition and concentration of the waterproofing agent. Through incorporation of silicone, water absorbency by volume of a fiberboard can be reduced by over 50%, more preferably by over 80%, and most preferably by over 90%, as compared to the fiberboard made under the same conditions from the same relative proportions of the same ingredients but without the silicone.

In manufacturing the fiberboard, the silicone fluid is charged into the slurry so that it is uniformly dispersed. It is important that the silicone fluid is uniformly dispersed, because very dilute concentrations of silicone fluid are employed. Adequate time for agitating the slurry should be provided to obtain a uniform dispersion.

Although the order of adding components to the slurry is not critical, the silicone fluid is added early relative to the other nonaqueous components, preferably first. Such early addition permits the silicone fluid opportunity to disperse while other components are added and mixed. If the silicone fluid is added later in the sequence, or is added in a concentrate in water, slurry agitation is continued for a sufficient length of time after all ingredients have been added until a uniform silicone fluid dispersion is achieved.

The fiberboard can also include optional ingredients, such as fine particulate dense clay fillers, and fire retardant additives, such as halogenated compounds and antimony- or zinc-containing compounds.

The present invention can be more fully understood by reference to the following representative examples of certain preferred embodiments thereof, where all parts, proportions and percentages are by weight unless otherwise indicated.

EXAMPLES

Examples G1–G7 and Comparative Example C1

Sample boards were made of four compositions: A, B, C and Control, as specific in Table 1. The components were charged to a sufficient amount of water to obtain a 4.5 wt % slurry. PMHS was added to the water first. The slurry was processed through fiberboard-making equipment operated in accordance with standards of the Technical Association of the Pulp and Paper Industry (TAPPI) to produce sample boards of selected densities. Groups of ten sample boards were produced for each of selected composition-density combinations of Examples G1–G7 and control group Comparative Example C1. Thickness and density of each of the sample boards, and the averages of the groups, are shown in Table 2.

TABLE 1

|  | A | B | C** | Control |
|---|---|---|---|---|
| Component wt %* | | | | |
| Mineral Wool | 29.75 | 39.45 | 65.37 | 39.50 |
| Perlite | 41.40 | 36.45 | 18.07 | 36.50 |
| Newsprint | 20.70 | 15.65 | 7.71 | 15.65 |
| Corn Starch | 8.00 | 8.30 | 8.67 | 8.30 |
| Gendriv ® 162 | 0.05 | 0.05 | 0.06 | 0.05 |
| PMHS | 0.10 | 0.10 | 0.12 | — |
| Clay | — | — | 20.48 | — |

*Based on total of mineral wool, perlite, newsprint, cornstarch, Gendriv ® 162, and PMHS.
**With respect to composition C, PMHS is 0.10 wt % and clay is 17.00 wt % of the sample.

For each group, sample boards were tested according to the following schedule:

side of a 0.060 inch thick film of ethylene/propylene/diene monomer rubber. After the adhesive had dried for 15 minutes, the coated surfaces were pressed together with a roller under hand pressure. The average force required to separate the film from the sample at a peel rate of 2 inches per minute over 0–3.5 inches of separation was measured. Peel strengths are reported in Table 3 as the averages of three sample board determinations.

Asphalt Adhesion Test: Type III asphalt was applied to a surface of Celo-Glass AGS Premium Fiberglass Ply Sheet and to the smooth surface of a sample board at a rate of 25 lbs./100 sq. ft. The sheet and board were immediately contacted and pressed with a hand roller. The test specimens were conditioned for 24 hours at 158° F. followed by at least 24 hours at 70° F. and 50% relative humidity. Adhesive strength was measured and reported in the same manner as peel strength.

TABLE 2

| | Example Composition | | | | | | | |
|---|---|---|---|---|---|---|---|---|
| | G1 A | | G2 B | | G3 A | | G4 B | |
| Board No. | Thickness (inch) | Density (PCF)* | Thickness (inch) | Density (PCF)* | Thickness (inch) | Density (PCF)* | Thickness (inch) | Density (PCF)* |
| 1 | 0.502 | 13.5 | 0.530 | 13.1 | 0.481 | 17.2 | 0.493 | 15.9 |
| 2 | 0.515 | 13.2 | 0.523 | 13.2 | 0.485 | 16.8 | 0.495 | 16.1 |
| 3 | 0.516 | 13.0 | 0.528 | 13.0 | 0.485 | 16.8 | 0.491 | 16.2 |
| 4 | 0.510 | 13.6 | 0.533 | 12.8 | 0.481 | 16.9 | 0.494 | 16.0 |
| 5 | 0.516 | 13.4 | 0.533 | 12.9 | 0.478 | 17.1 | 0.489 | 16.2 |
| 6 | 0.520 | 13.2 | 0.534 | 12.9 | 0.478 | 16.8 | 0.493 | 16.0 |
| 7 | 0.511 | 13.6 | 0.528 | 12.9 | 0.483 | 17.1 | 0.490 | 16.4 |
| 8 | 0.512 | 13.5 | 0.535 | 12.7 | 0.484 | 17.0 | 0.488 | 15.9 |
| 9 | 0.512 | 13.6 | 0.525 | 13.2 | 0.495 | 16.4 | 0.486 | 16.4 |
| 10 | 0.511 | 13.3 | 0.528 | 13.3 | 0.486 | 16.7 | 0.484 | 16.2 |
| Avg. | 0.512 | 13.4 | 0.530 | 13.0 | 0.484 | 16.9 | 0.490 | 16.1 |

| | Example Composition | | | | | | | |
|---|---|---|---|---|---|---|---|---|
| | G5 A | | G6 B | | G7 C | | G1 Control B | |
| Board No. | Thickness (inch) | Density (PCF)* | Thickness (inch) | Density (PCF)* | Thickness (inch) | Density (PCF)* | Thickness (inch) | Density (PCF)* |
| 1 | 0.490 | 19.4 | 0.490 | 19.5 | 0.507 | 18.0 | 0.499 | 13.8 |
| 2 | 0.485 | 19.5 | 0.496 | 19.2 | 0.524 | 17.5 | 0.501 | 14.0 |
| 3 | 0.482 | 19.7 | 0.497 | 18.8 | 0.512 | 18.0 | 0.496 | 13.9 |
| 4 | 0.481 | 19.4 | 0.494 | 19.4 | 0.497 | 18.3 | 0.496 | 14.0 |
| 5 | 0.484 | 19.7 | 0.497 | 19.2 | 0.502 | 18.2 | 0.495 | 14.0 |
| 6 | 0.482 | 19.8 | 0.496 | 18.9 | 0.497 | 18.4 | 0.498 | 13.5 |
| 7 | 0.486 | 19.9 | 0.493 | 19.1 | 0.512 | 18.1 | 0.490 | 14.1 |
| 8 | 0.490 | 19.5 | 0.496 | 18.8 | 0.501 | 18.4 | 0.496 | 13.5 |
| 9 | 0.490 | 19.7 | 0.489 | 19.7 | 0.500 | 18.4 | 0.494 | 13.8 |
| 10 | 0.498 | 19.6 | 0.492 | 19.0 | 0.499 | 18.5 | 0.498 | 13.7 |
| Avg. | 0.487 | 19.6 | 0.494 | 19.2 | 0.505 | 18.2 | 0.496 | 13.8 |

*pounds per cubic foot

Sample Boards 1, 8, 9 and 10

Water absorption was determined by ASTM D1037.

Sample Boards 2, 3 and 4

Peel Strength Test: "Celo-1" Field Adhesive, a product of Celotex Corporation, was applied at the rate of 120 sq. ft./gallon to the smooth surface of a sample board and to one Vapor Permeance was determined by ASTM Standard E96. Flexural Strength was measured on 0.5 inch×6 inch×12 inch samples according to the three-point test procedure of ASTM C203.

Sample Boards 5, 6 and 7

Compressive Strength was determined in accordance with ASTM C165.

Dimensional Stability was measured as the percent change in dimensions of a 0.5 inch×3 inch×12 inch sample at 70° F. due to change from 50% to 90% relative humidity.

Tensile Strength was measured in accordance with ASTM C209.

Hardness was measured in accordance with ASTM C367.

Sample Board 8

Thermal Resistance, Thermal Conductance and Thermal Conductivity were measured in accordance with ASTM Standard C518.

Water absorption results are shown in the FIGURE and other test results are presented in Table 3.

The FIGURE is a bar graph of percent water absorption by volume plotted for each of the sample groups. Water absorption of all Groups G1–G7 was substantially less than the water absorption of the Control Group C1. Comparison of Group G2 and C1 results demonstrates that silicone fluid is highly effective for improving water resistance without adversely affecting other properties of the fiberboard. By addition of only 0.10 wt % PMHS, water absorption dropped from over 40% to about 2%. The composition of Group G7 boards contained an additive of dense clay at about 20 wt % concentration based on the total weight of the other non-aqueous components. Group 7 samples also exhibited significantly better water-resistance than the Control Group C1 samples.

The physical properties of Group G2 are slightly different from corresponding control group properties. However, the difference is attributable to the densities of the samples. An effect of density on physical properties is seen by comparing results among Groups G2, G4 and G6, and among Groups G1, G3 and G5. Tensile, compressive and flexural strengths increase with density, for example. Group G2 boards were less dense (average density 13.0 pounds per cubic foot) than Control Group C1 (average density 13.8 pounds per cubic foot). Therefore, tensile, compressive and flexural strengths of G2 should be slightly lower than those of C1. When the effect on properties due to the density differences between Group G2 and Control Group C1 is taken into account, physical properties other than absorption are substantially unaffected by the presence of silicone fluid. Therefore, mineral fiberboard according to the present invention demonstrates superior water-resistance without sacrificing structural integrity.

We claim:

1. Fiberboard consisting essentially of:
   (a) about 0 to about 98 wt % mineral fiber;
   (b) about 0 to about 98 wt % low density, nonfibrous inorganic filler;
   (c) about 0 to about 98 wt % organic fiber;
   (d) about 1 to about 15 wt % starch;
   (e) about 0.01 to about 0.5 wt % flocculant; and
   (f) about 0.01 to about 2 wt % silicone fluid;

TABLE 3

| Group/Example | G1 | G2 | G3 | G4 | G5 | G6 | G7 | C1 |
|---|---|---|---|---|---|---|---|---|
| Nominal Density, PCF | 13 | 13 | 15 | 15 | 18 | 18 | 19 | 13 |
| Tensile Strength Perpendicular to Surface | | | | | | | | |
| Stress at Peak, psi | 14.36 | 12.05 | 21.28 | 18.27 | 26.04 | 20.48 | 13.11 | 12.10 |
| Load at Peak, lbs | 57.44 | 48.19 | 85.10 | 73.07 | 104.20 | 81.92 | 52.45 | 48.39 |
| Tensile Strength Parallel to Surface | | | | | | | | |
| Stress at Peak, psi | 200.8 | 170.2 | 277.8 | 227.6 | 323.6 | 278.4 | 219.3 | 203.9 |
| Load at Peak, lbs | 156.8 | 136.0 | 204.0 | 169.6 | 238.2 | 210.6 | 167.5 | 151.4 |
| Compressive Strength | | | | | | | | |
| psi @ 5% deflection | 1267 | 998 | 1933 | 1383 | 2142 | 1733 | 1008 | 1170 |
| psi @ 10% deflection | 1998 | 1392 | 3293 | 2292 | 3917 | 3033 | 1608 | 1917 |
| psi @ 25% deflection | 3067 | 2192 | 5325 | 3892 | 7183 | 5667 | 2392 | 2979 |
| Dimensional Stability, % | 0.011 | −0.019 | 0.036 | −0.008 | 0.048 | 0.056 | −.011 | 0.011 |
| Water Vapor Transmission Rate | | | | | | | | |
| grains/hr ft$^2$ inch Hg | 11.5 | 12.0 | 9.9 | 10.6 | 7.7 | 9.1 | 9.1 | 10.1 |
| Perms | 31.0 | 32.4 | 26.8 | 28.6 | 20.8 | 24.6 | 24.7 | 27.4 |
| Flexural Strength | | | | | | | | |
| M.O.E.,** psi | 20640 | 22690 | 28500 | 28860 | 31750 | 32580 | 48590 | 24280 |
| M.O.R.,*** psi | 200.9 | 194.9 | 292.1 | 250.1 | 362.3 | 329.5 | 268.6 | 222.5 |
| Load at break, lbs | 21.67 | 22.02 | 27.28 | 24.80 | 34.48 | 32.78 | 28.45 | 22.13 |
| Deflection at Break, inch | 0.4063 | 0.3519 | 0.4959 | 0.3688 | 0.5505 | 0.4469 | 0.2076 | 0.3984 |
| Hardness, psi at ¼ inch penetration | 191.3 | 137.7 | 353.3 | 254.0 | 455.0 | 376.7 | 155.7 | 170.7 |
| Thermal Resistance, hour ft$^2$ °F./BTU | 1.47 | 1.61 | 1.17 | 1.48 | 1.22 | 1.25 | 1.32 | 1.47 |
| Thermal Conductance, BTU/ hour ft$^2$ °F. | 0.681 | 0.620 | 0.858 | 0.676 | 0.820 | 0.800 | 0.756 | 0.678 |
| Thermal Conductivity, BTU-inch/hour ft$^2$ °F. | 0.365 | 0.342 | 0.431 | 0.384 | 0.470 | 0.414 | 0.394 | 0.345 |
| Peel strength*, lb$_f$/inch | 1.841 | 1.959 | 2.687 | 3.445 | 5.074 | 2.877 | 2.798 | 2.874 |
| Asphalt adhesion*, lb$_f$/inch | 2.274 | 1.575 | 3.149 | 2.045 | 3.159 | 2.969 | 0.836 | 1.694 |

*All specimens separated as result of delamination of the fiberboard.
**Modulus of Elasticity
***Modulus of Rupture wherein said percentages are based on the total of components (a)–(f), and provided that at least one of (a) and (c) is present and wherein inclusion of the silicone fluid results in reduction of the water absorbency by volume of the fiberboard by over 50%, as compared to the fiberboard made from the same relative proportions of the ingredients but without the silicone fluid.

2. Fiberboard according to claim 1 wherein the mineral fiber is mineral wool, the low density, nonfibrous inorganic filler is perlite and the organic fiber is cellulosic fiber.

3. Fiberboard according to claim 2 wherein mineral wool is present from about 28 to about 40 wt %; perlite is present from about 25 to about 42 wt %; cellulosic fiber is present from about 15 to about 23 wt %; and starch is present from 7 to about 11 wt %.

4. Fiberboard according to claim 1 wherein the silicone fluid is polymethylhydrogensiloxane.

5. Fiberboard according to claim 4 wherein polymethylhydrogen-siloxane is present from about 0.1 wt % to about 0.5 wt %.

6. Fiberboard according to claim 4 wherein the mineral fiber is present from about 20 to about 75 wt %; the low density, nonfibrous inorganic filler is present from about 10 to about 50 wt %; and the organic fiber is present from about 5 to about 40 wt %.

7. Fiberboard according to claim 4 wherein the mineral fiber is 0 wt %; the low density, nonfibrous inorganic filler is present from about 20 to about 98 wt %; and the organic fiber is present from about 10 to about 70 wt %.

8. Fiberboard according to claim 4 wherein the mineral fiber is present from about 30 to about 98 wt %; the low density, nonfibrous inorganic filler is present from about 10 to about 60 wt %; and the organic fiber is 0 wt %.

9. Fiberboard according to claim 1 wherein silicone fluid is present from about 0.1 wt % to about 1 wt %.

10. A process for making fiberboard comprising the steps of: mixing selected components with water to obtain a slurry having consistency suitable for making fiberboard, said selected components consisting essentially of:
(a) about 0 to about 98 wt % mineral fiber;
(b) about 0 to about 98 wt % low density, nonfibrous inorganic filler;
(c) about 0 to about 98 wt % organic fiber;
(d) about 1 to about 15 wt % starch;
(e) about 0.01 to about 0.5 wt % flocculant; and
(f) about 0.01 to about 2 wt % silicone fluid;
wherein said percentages are based on the total of components (a)–(f), and provided that at least one of (a) and (c) is present and wherein inclusion of the silicone fluid results in reduction of the water absorbency by volume of the fiberboard by over 50%, as compared to the fiberboard made from the same relative proportions of the ingredients but without the silicone fluid;

agitating said slurry until said components are uniformly dispersed in the water;

forming a mat from said slurry; and removing the water from said mat to form a dry article.

11. A process according to claim 10 wherein said dry article is formed into sheets.

12. A process according to claim 10 wherein said silicone fluid is polymethylhydrogensiloxane.

13. A process according to claim 10 wherein the silicone fluid is mixed with the water before mixing components (a)–(e).

14. Fiberboard comprising:
at least 70 wt % primary components of the group consisting of mineral fiber, organic fiber, and low density, nonfibrous inorganic filler;
at least 1 wt % starch; and
about 0.01 wt % to about 2 wt % silicone fluid wherein inclusion of the silicone fluid results in reduction of the water absorbency by volume of the fiberboard by over 50%, as compared to the fiberboard made from the same relative proportions of the ingredients but without the silicone fluid.

15. Fiberboard according to claim 14 wherein the mineral fiber is mineral wool; the low density, nonfibrous inorganic filler is perlite and the organic fiber is cellulosic fiber.

16. Fiberboard according to claim 14 wherein silicone fluid is present from about 0.1 wt % to about 1 wt %.

17. Fiberboard according to claim 14 wherein the silicone fluid is polymethylhydrogensiloxane.

18. Fiberboard according to claim 17 wherein polymethylhydrogen-siloxane is present from about 0.1 wt % to about 0.5 wt % of the fiberboard.

19. Fiberboard according to claim 15 wherein said fiberboard comprises about 28 to about 40 wt % mineral wool; about 25 to about 42 wt % perlite; about 15 to about 23 wt % cellulosic fiber; and about 7 to about 11 wt % starch, wherein said percentages are based on the total of all materials present in the fiberboard.

20. Fiberboard according to claim 14 wherein said fiberboard further comprises 17 wt % clay.

* * * * *